United States Patent
Joo et al.

(10) Patent No.: US 8,372,273 B2
(45) Date of Patent: Feb. 12, 2013

(54) WATER PURIFYING FILTER ASSEMBLY MODULE

(75) Inventors: Woo Il Joo, Seoul (KR); In Du Choi, Seoul (KR); Jung Hwan Lee, Seoul (KR); Hyun Young Kim, Seoul (KR)

(73) Assignee: Woongjin Coway Co., Ltd. (KR)

( * ) Notice: Subject to any disclaimer, the term of this patent is extended or adjusted under 35 U.S.C. 154(b) by 288 days.

(21) Appl. No.: 12/826,846

(22) Filed: Jun. 30, 2010

(65) Prior Publication Data

US 2011/0220559 A1    Sep. 15, 2011

(30) Foreign Application Priority Data

Mar. 11, 2010   (KR) .................. 10-2010-0021726

(51) Int. Cl.
*B01D 27/10* (2006.01)

(52) U.S. Cl. ............. 210/85; 210/87; 210/234; 210/236

(58) Field of Classification Search .............. 210/85, 210/87, 241, 232, 236, 234
See application file for complete search history.

(56) References Cited

U.S. PATENT DOCUMENTS

| | | | |
|---|---|---|---|
| 4,681,677 A * | 7/1987 | Kuh et al. ................ | 210/88 |
| 7,387,210 B2 * | 6/2008 | Burrows et al. .......... | 210/443 |
| 7,501,057 B1 | 3/2009 | Go | |
| 2001/0040121 A1 | 11/2001 | Giordano et al. | |
| 2003/0168394 A1 | 9/2003 | Gill | |
| 2005/0109096 A1 | 5/2005 | Goldfarb | |
| 2008/0029452 A1 | 2/2008 | Lin | |

FOREIGN PATENT DOCUMENTS

| | | |
|---|---|---|
| EP | 1 321 637 A1 | 6/2003 |
| EP | 1 600 199 A1 | 11/2005 |
| KR | 20-0432225 | 11/2006 |
| WO | WO 99/10069 A1 | 3/1999 |
| WO | WO 2005/077490 A1 | 8/2005 |
| WO | WO 2006/124906 A1 | 11/2006 |

\* cited by examiner

*Primary Examiner* — Terry Cecil
(74) *Attorney, Agent, or Firm* — Dority & Manning, P.A.

(57) ABSTRACT

There is provided a water purifying filter assembly module that a water purifying filter can be easily released from or assembled with. The water purifying filter assembly module may include: a filter assembly head having a water purifying filter assembled on one side thereof, the filter assembly head configured such that water to be filtered flows into the water purifying filter and the water, filtered through the water purifying filter, is discharged to an outside thereof; and a module body having the filter assembly head rotatably provided therein, the water purifying filter being released from or assembled on the filter assembly head as the water purifying filter is aligned and rotates with the filter assembly head.

9 Claims, 7 Drawing Sheets

WATER PURIFYING FILTER ASSEMBLY MODULE

CROSS-REFERENCE TO RELATED APPLICATIONS

This application claims the priority of Korean Patent Application No. 10-2010-0021726 filed on Mar. 11, 2010, in the Korean Intellectual Property Office, the disclosure of which is incorporated herein by reference.

BACKGROUND OF THE INVENTION

1. Field of the Invention

The present invention relates to a water purifying filter assembly module having a water purifying filter that can be easily released therefrom or assembled therewith.

2. Description of the Related Art

A water purifying filter assembly module is configured such that the water purifying filter assembly module is assembled with a water purifying filter. Also, the water purifying filter assembly module is configured so that water to be filtered flows into the water purifying filter assembled therewith and the water, filtered through the water purifying filter, is discharged.

As for a water purifying filter assembly module according to the related art, in the case a water purifying filter is located under the water purifying filter assembly module, the water purifying filter is moved upwards and assembled within the water purifying assembly module. For example, the water purifying filter may be assembled on the water purifying filter assembly module with a screw connection or may be caught by a protrusion formed on the water purifying assembly module so that the water purifying filter is assembled on the water purifying filter assembly module.

Therefore, when the water purifying filter assembly module is located at a lower position, while a user cannot see a filter assembly head, which is provided in the water purifying filter assembly module and has a water purifying filter assembled thereon, the water purifying filter is assembled on the water purifying filter assembly module. As a result, it becomes difficult to perform the assembly of the water purifying filter.

Furthermore, when there is not enough room under the water purifying filter assembly module to place the water purifying filter, it is also difficult to assemble the water purifying filter.

In the case that the water purifying filter is assembled on the water purifying filter assembly module by a screw connection, a larger force is required to assemble the water purifying filter.

When the water purifying filter is assembled on the water purifying filter assembly module in such a manner that the water purifying filter is caught by the protrusion provided on the water purifying filter assembly module, if high-pressure water is introduced into the water purifying filter, the water purifying filter may fall down during the assembly of the water purifying filter.

Furthermore, water leakage may occur through a portion of the water purifying filter assembly module, on which the water purifying filter is assembled, due to the weight of the water purifying filter.

SUMMARY OF THE INVENTION

An aspect of the present invention is to assemble a water purifying filter on a filter assembly head provided in a water purifying filter assembly module during the assembly of the water purifying filter while the filter assembly head is being watched.

An aspect of the present invention is also to assemble a water purifying filter on a water purifying filter assembly module with a small force.

An aspect of the present invention is also to prevent a water purifying filter from falling down during the assembly of the water purifying filter even when high-pressure water flows into the water purifying filter.

An aspect of the present invention is also to prevent leakage of water through a portion of a water purifying filter assembly module on which the water purifying filter is assembled during the assembly of the water purifying filter or after the assembly of the water purifying filter.

An aspect of the present invention is also to allow for the changing of a water purifying filter in a timely manner by informing a time to change a water purifying filter.

According to an aspect of the present invention, there is provided a water purifying filter assembly module including: a filter assembly head having a water purifying filter assembled on one side thereof, the filter assembly head configured such that water to be filtered flows into the water purifying filter and the water, filtered through the water purifying filter, is discharged to an outside thereof; and a module body having the filter assembly head rotatably provided therein, the water purifying filter being released from or assembled on the filter assembly head as the water purifying filter is aligned and rotates with the filter assembly head.

The module body may include a movement guide portion into which a guide protrusion, provided on the water purifying filter, is inserted and moved, and the guide protrusion may be moved while being supported by the movement guide portion as the filter assembly head rotates together with the water purifying filter while the guide protrusion is inserted into the movement guide portion and the water purifying filter is aligned with the filter assembly head, so that the water purifying filter is released or assembled.

The movement guide portion may form a curve connecting a release position of the guide protrusion inside the module body at which the water purifying filter is released and an assembly position of the guide protrusion inside the module body at which the water purifying filter is assembled.

A distance between a rotation center of the filter assembly head and the release position of the movement guide portion may be larger than a distance between the rotation center and the assembly position of the movement guide portion.

The filter assembly head may include: a filter assembly portion on which the water purifying filter is assembled, the filter assembly portion configured such that water to be filtered flows into the water purifying filter and the water, filtered through the water purifying filter, is discharged; an inlet portion connected to the filter assembly portion such that water flows into the filter assembly portion, the inlet portion rotatably provided on a rotation portion provided on one side of the module body; and an outlet portion connected to the filter assembly portion such that water is discharged from the filter assembly portion, the outlet portion rotatably provided on a rotation portion provided on the other side of the module body.

The filter assembly portion may include a check valve being closed when the water purifying filter is released in order to prevent water from flowing into the water purifying filter and being opened when the water purifying filter is assembled in order to introduce water into the water purifying filter.

The water purifying filter assembly module may further include a filter change time indicator provided in the module body and indicating a time to change the water purifying filter.

The filter change time indicator may be configured to receive or discharge water, discharged from the filter assembly head, measure a cumulative flow rate of introduced water, and indicate the time to change the water purifying filter.

The filter change time indicator may include a rotation member rotated by the flow of water being introduced thereinto, wherein the filter change time indicator measures a cumulative flow rate of introduced water on the basis of the number of rotations of the rotation member.

The filter change time indicator may further include: a plurality of gears connected to the rotation member; and a display member connected to one of the plurality of gears, wherein the filter change time indicator indicates the time to change the water purifying filter by the rotation of the display member caused by the rotation of the rotation member and the plurality of gears.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
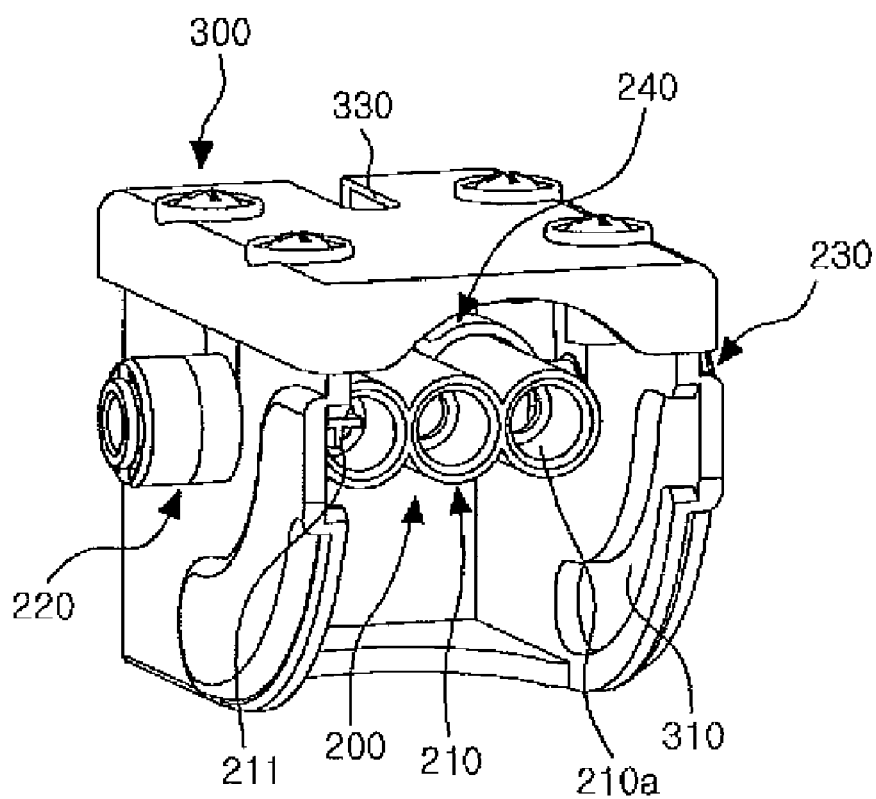
FIG. 1 is a perspective view illustrating a water purifying filter assembly module according to an exemplary embodiment of the present invention.

A water purifying filter assembly module in association with exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. While the present invention will be shown and described in connection with the exemplary embodiments, it will be apparent to those skilled in the art that modifications and variations can be made without departing from the spirit and scope of the invention as defined by the appended claims. In the drawings, shapes and dimensions may be exaggerated for clarity, and the same or similar reference numerals will be used throughout to designate the same or like components.

Exemplary embodiments of the present invention are based on the configuration in which a water purifying filter is aligned with a filter assembly head, which is provided in a water purifying filter assembly module and has the water purifying filter assembled on, and the water purifying filter and the filter assembly head rotate together, so that the water purifying filter is released from or assembled on the filter assembly head.

Figure 2:
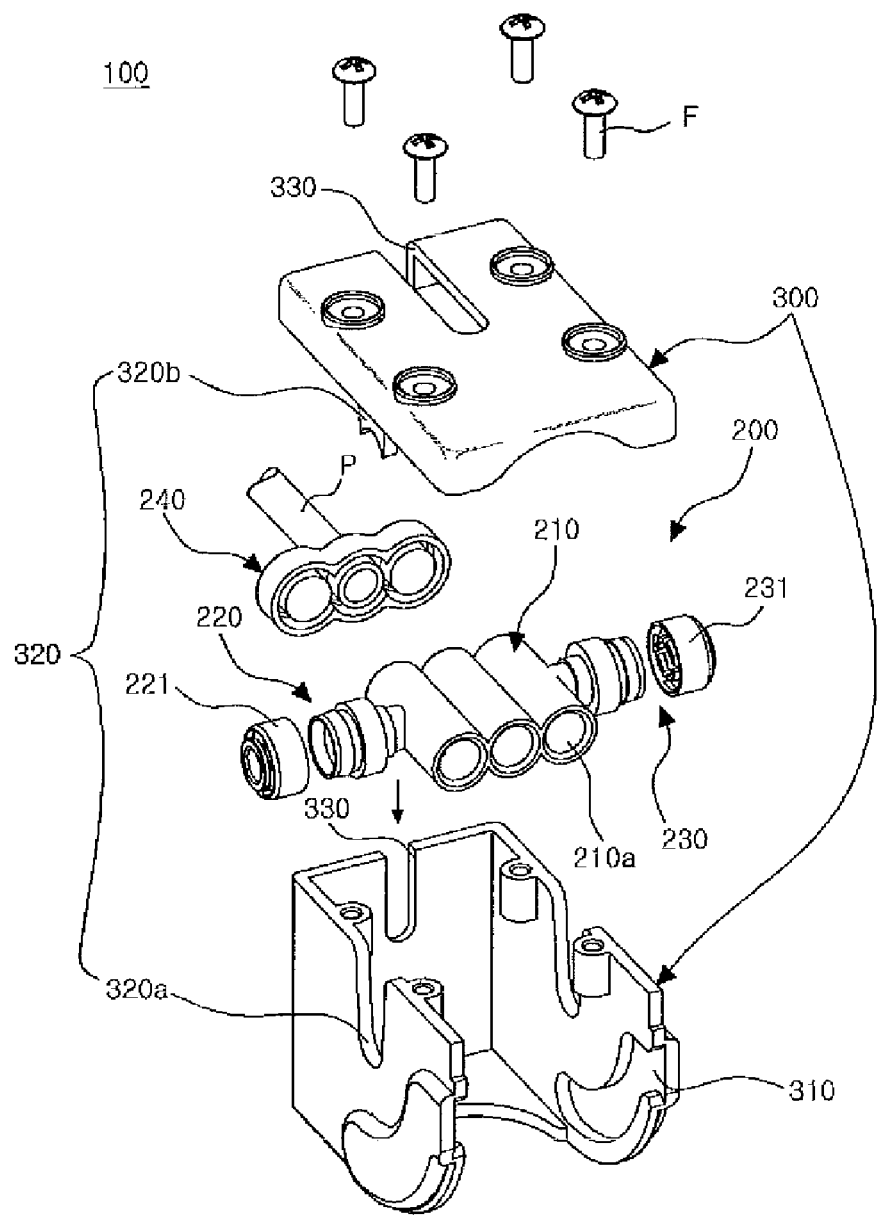
FIG. 2 is an exploded perspective view illustrating a water purifying filter assembly module according to an exemplary embodiment of the present invention.
Figure 3:
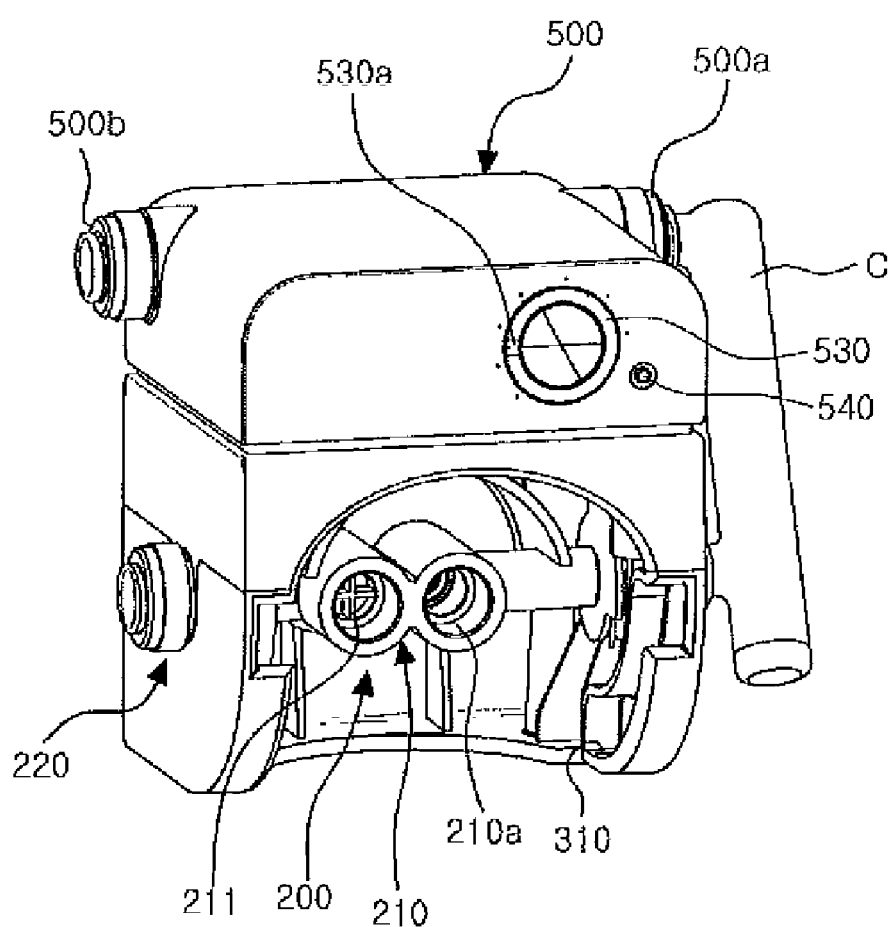
FIG. 3 is a perspective view illustrating a water purifying filter assembly module according to another exemplary embodiment of the present invention.

A water purifying filter assembly module 100 according to an exemplary embodiment of the invention may include a filter assembly head 200 and a module body 300 as shown in exemplary embodiments with reference to FIGS. 1 through 3.

The filter assembly head 200 may have a water purifying filter 400 assembled on one side thereof. Also, the filter assembly head 200 may be configured so that water to be filtered flows into the water purifying filter 400 and the water, filtered through the water purifying filter 400, is discharged to the outside. To this end, as shown in the exemplary embodiments with reference to FIGS. 1 through 3, the filter assembly head 200 may include a filter assembly portion 210, an inlet portion 220, and an outlet portion 230.

As shown in FIGS. 5 through 7, the water purifying filter 400 may be assembled on the filter assembly portion 210 of the filter assembly head 200. Furthermore, the filter assembly portion 210 may be configured so that water to be filtered flows into the water purifying filter 400 and the water, filtered through the water purifying filter 400, is discharged. To this end, as shown in the exemplary embodiments with reference to FIGS. 1 through 3, assembly holes 210a may be formed through the filter assembly portion 210. Connection nipples 420, provided in the water purifying filter 400, may be inserted into one set of sides of the assembly holes 210a. The water purifying filter 400 needs to have the connection nipple 420 by which water to be filtered flows into the water purifying filter 400 and the connection nipple 420 by which the water, filtered through the water purifying filter 400, is discharged. Therefore, at least two connection nipples 420 may be formed in the water purifying filter 400. Thus, as shown in the exemplary embodiments with reference to FIGS. 1 through 3, at least two assembly holes 210a may be correspondingly formed in the filter assembly portion 210. As such, the connection nipples 420 of the water purifying filter 400 are inserted into the assembly holes 210a of the filter assembly portion 210, so that the water purifying filter 400 is assembled on the filter assembly portion 210. Also, water to be filtered may flow into the water purifying filter 400, and the water, filtered through the water purifying filter 400, may be discharged.

As shown in the exemplary embodiment with reference to FIGS. 1 and 2, three assembly holes 210a may be formed in the filter assembly portion 210 because the water purifying filter 400, on which the filter assembly portion 210 is assembled, is a membrane filter. That is, as water to be filtered flows into the membrane filter and the filtered water is discharged together with drain water not having been filtered, the membrane filter has the connection nipple 420 by which water to be filtered is introduced, the connection nipple 420 by which the filtered water is discharged, and the connection nipple 420 by which drain water is discharged. Thus, the filter assembly portion 210 also needs to have the corresponding assembly hole 210a into which the connection nipple 420 of the membrane filter is, by which drain water is discharged, inserted. That is, as shown in FIGS. 1 and 2, the connection nipple 420, by which water to be filtered is introduced, may be inserted into the assembly hole 210a on the left, the connection nipple 420, by which the filtered water is discharged, may be inserted into the assembly hole 210a on the right, and the connection nipple 420, by which drain water not having been filtered is discharged, may be inserted into the assembly hole 210a in the middle.

Furthermore, as shown in the exemplary embodiment with reference to FIGS. 1 and 2, in the case that a membrane filter is used as the water purifying filter 400, three connection nipples 420 may be placed in a row in the membrane filter. As shown in the exemplary embodiment with reference to FIGS. 1 and 2, three assembly holes 210a, into which the corresponding connection nipples 420 are respectively inserted, may be placed in a row in the filter assembly portion 210. However, the arrangement of the connection nipples 420 of the water purifying filter 400 or the arrangement of the assembly holes 210a of the filter assembly portion 210 is not limited to the exemplary embodiments shown in FIGS. 1 through 3. Any arrangement is possible as long as the connection nipples 420 of the water purifying filter 400 are inserted into the respective assembly holes 210a of the filter assembly portion 210 of the filter assembly head 200, and the water purifying filter 400 rotates together with the filter assembly head 200.

Meanwhile, in order to close the other set of sides of the assembly holes 210a in which the water purifying filter 400 is not assembled, as shown in the exemplary embodiment with reference to FIG. 2, an assembly hole cover 240 may be used. Also, as shown in FIGS. 5 through 7, sealing members R are provided in the respective connection nipples 420 of the water purifying filter 400, thereby sealing spaces between the assembly holes 210a and the connection nipples 420.

Furthermore, as described above, when a membrane filter, through which drain water is discharged, is used as the water purifying filter 400, as shown in the exemplary embodiment with reference to FIGS. 1 and 2, an outlet pipe P for discharging drain water may be connected to the assembly hole 210a through which drain water is discharged. As described above, the three connection nipples 420 are formed in a low in the water purifying filter 400. However, in a different manner, in case that a membrane filter is used as the water purifying filter 400, the connection nipple 420, by which water to be filtered is introduced, and the connection nipple 420, by which the filtered water is discharged, may be located to be adjacent to each other, while the connection nipple 420, by which drain water is discharged, may be formed in another row. In this case, the assembly hole 210a, into which the connection nipple 420, by which water to be filtered is introduced, is inserted and the assembly hole 210a, into which the connection nipple 420, by which the filtered water is discharged, is inserted may be formed in the filter assembly portion 210, while the assembly hole 210a, into which the connection nipple 420, by which drain water is discharged, is inserted may not be formed. Furthermore, in this case, the outlet pipe P for discharging drain water may be directly connected to the connection nipple 420 of the water purifying filter 400, by which drain water is discharged, rather than being connected to the assembly holes 210a of the filter assembly portion 210.

As shown in the exemplary embodiments with reference to FIGS. 1 through 3, the filter assembly portion 210 may further include a check valve 211. As shown in FIG. 5, the check valve 211 may be closed when the water purifying filter 400 is released, so that water may not flow into the water purifying filter 400. Accordingly, water leakage occurring when the water purifying filter 400 is released can be prevented. As shown in FIG. 7, the check valve 211 may be opened during the assembly of the water purifying filter 400, so that water may flow into the water purifying filter 400. To this end, as shown in the exemplary embodiments in the drawings, the check valve 211 may be provided in one of the assembly holes 210a of the filter assembly portion 210, that is, the assembly hole 210a into which the connection nipple 420, by which water to be filtered flows into the water purifying filter 400, is inserted. Thus, as shown in FIG. 5, when the connection nipple 420 is inserted into the assembly hole 210a but does not reach the check valve 211, the assembly hole 210a is closed by the check valve 211. As a result, water may not be introduced into the water purifying filter 400. Furthermore, as shown in FIG. 6 or FIG. 7, when the connection nipple 420 is inserted into the assembly hole 210a and the check valve 211 is therefore pushed, the assembly hole 210a is opened. Thereby, water may flow into the water purifying filter 400.

As shown in the exemplary embodiments with reference to FIGS. 1 through 3, the inlet portion 220 may be connected to the filter assembly portion 210 so that water may flow towards the filter assembly portion 210. To this end, as shown in FIGS. 5 through 7, a flow path 220a, formed in the inlet portion 220, may be connected to one of the assembly holes 210a of the filter assembly portion 210, that is, the assembly hole 210a, into which the connection nipple 420, by which water to be filtered flows into the water purifying filter 400, is inserted. A connection member 221 may be provided in the inlet portion 220. Here, the connection member 221 is connected to a water supply source (not shown) or a connection pipe C connected to an outlet portion 230 of another filter assembly module 100 as shown in FIG. 7. Also, the inlet portion 220 may be rotatably provided in a rotation portion 320 formed on one side of the module body 300.

As shown in the exemplary embodiments with reference to FIGS. 1 through 3, the outlet portion 230 may be connected to the filter assembly portion 210 so that water is discharged from the filter assembly portion 210. To this end, as shown in FIGS. 5 through 7, a flow path 230a, formed in the outlet portion 230, may be connected to one of the assembly holes 210a of the filter assembly portion 210, that is, the assembly hole 210a into which the connection nipple 420, by which the water, filtered through the water purifying filter 400, is discharged, is inserted. The outlet portion 230 may also have a connection member 231, which is connected to an inlet portion 220 of another filter 100 or a connection pipe C connected to a water discharging device (not shown), such as a water discharging cock. Also, the outlet portion 230 may be rotatably provided on a rotation portion 320 formed on the other side of the module body 300. As described above, the inlet portion 220 is rotatably provided on the rotation portion 320 formed on one side of the module body 300, and the outlet portion 230 is rotatably provided on the rotation portion 320 formed on the other side of the module body 300, so that the filter assembly head 200 can rotate in the module body 300.

The filter assembly head 200 may be provided so as to be rotatable in the module body 300. As described above, the inlet portion 220 is rotatably provided on the rotation portion 320 formed on one side of the module body 300, and the outlet portion 230 is rotatably provided on the rotation portion 320 formed on the other side of the module body 300, so that filter assembly head 200 can be provided so as to be rotatable in the module body 300. To this end, as shown in the exemplary embodiment with reference to FIG. 2, the module body 300 may be divided into upper and lower parts. A rotation guide groove 320a may be provided in the lower part of the module body 300 so that the inlet portion 220 or the outlet portion 230 may be rotatably inserted therein. Also, a rotation guide protrusion 320b may be formed on the upper part of the module body 300 so that the inlet portion 220 or the outlet portion 230, rotatably inserted into the rotation guide groove 320a, cannot be separated from the module body 300. The upper and lower parts of the module body 300 may be assembled to be a single body by fixing members F such as bolts.

As described above in the exemplary embodiment with reference to FIGS. 1 and 2, a membrane filter through which drain water is discharged may be used as the water purifying filter 400, and the assembly holes 210a may be placed in a row in the filter assembly portion 210 of the filter assembly head 200. In this case, as described above, in order to prevent the outlet pipe P for discharging drain water, which is connected to the assembly hole 210a through which drain water is discharged, from interrupting the rotation of the filter assembly head 200 together with the water purifying filter 400, a rotation guide hole 330 may be formed in the module body 300. In addition, as described above, when a membrane filter is used as the water purifying filter 400, the connection nipple 420 by which drain water is discharged may be formed in a different row from another connection nipple 420. Also, the outlet pipe P for discharging drain water may be directly connected to the connection nipple 420 of the water purifying filter 400 by which drain water is discharged, rather than being connected to the assembly hole 210a of the filter assembly portion 210. In this case, as shown in the exemplary embodiment, the rotation guide hole 330 may be formed in the side surface of the module body 300 rather than the rear surface or the upper surface thereof.

By the module body 300 having the above-described configuration, the water purifying filter 400 may be aligned and rotated with the filter assembly head 200. Also, the water purifying filter 400 can be released from the filter assembly head 200 or assembled on the filter assembly head 200. Therefore, during the assembly of the water purifying filter 400, the water purifying filter 400 can be assembled on the filter assembly head 200 while the filter assembly head 200 is being watched. Furthermore, the water purifying filter 400 can be assembled on the water purifying filter assembly module 100 with a small force. To this end, as shown in the exemplary embodiments with reference to FIGS. 1 through 3, a movement guide portion 310 may be formed on the module body 300 so that a guide protrusion 410, formed on the water purifying filter 400, moves along the movement guide portion 310 while being inserted therein. As shown in the exemplary embodiments in FIGS. 1 through 3, the movement guide portion 310 is recessed into a groove. However, the invention is not limited thereto. The movement guide portion 310 may be formed into a hole or any other shape as long as the guide protrusion 410 of the water purifying filter 400 is inserted into the movement guide portion 310 and moves along the same. As such, as the guide protrusion 410 of the water purifying filter 400 is inserted into the movement guide portion 310, the water purifying filter 400 can be easily aligned with the filter assembly head 200. The filter assembly head 200 can thereby rotate together with the water purifying filter 400. The guide protrusion 410 may be thereby moved while being supported by the movement guide portion 310. Also, the water purifying filter 400 can be released or assembled. As a result, even when high-pressure water flows into the water purifying filter 400, the water purifying filter 400 can be prevented from falling down during the assembly of the water purifying filter 400. Also, during the assembly of the water purifying filter 400 or after the assembly of the water purifying filter 400, leakage of water through a portion of the water purifying filter assembly module 100 on which the water purifying filter 400 is assembled can be prevented.

To this end, as shown in the exemplary embodiments with reference to FIGS. 1 through 3 and as shown in FIGS. 5 through 7, the movement guide portion 310 may form a curve connecting a release position a of the guide protrusion 410 inside the module body 300 at which the water purifying filter 400 is released from the filter assembly head 200 and an assembly position b of the guide protrusion 410 inside the module body 300 at which the water purifying filter 400 is assembled thereon. Also, a distance L between a rotation center O of the filter assembly head 200 and the release position a of the movement guide portion 310 may be larger than a distance L' between the rotation center O of the filter assembly head 200 and the assembly position b of the movement guide portion 310. For example, as shown in the exemplary embodiment, a difference between the distance L between a rotation center O of the filter assembly head 200 and the release position a of the movement guide portion 310 and the distance L' between the rotation center O of the filter assembly head 200 and the assembly position b of the movement guide portion 310 may be equal to a distance by which the connection nipple 420 of the water purifying filter 400 moves so as to be inserted into the assembly hole 210a of the filter assembly portion 210. Thus, when the guide protrusion 410 of the water purifying filter 400 is inserted into the movement guide portion 310 of the module body 300 and moves, that is, when the water purifying filter 400 rotates together with the filter assembly head 200, the water purifying filter 400 may be released from the filter assembly head 200 or assembled on the filter assembly head 200. That is, in the exemplary embodiment shown in the drawings, the connection nipples 420 of the water purifying filter 400 may be released from the assembly holes 210a of the filter assembly head 200 or the connection nipples 420 may be completely inserted into the assembly holes 210a of the filter assembly head 200.

As shown in the exemplary embodiment with reference to FIG. 3, the water purifying filter assembly module 100 according to an exemplary embodiment of the invention may further include a filter change time indicator 500. The filter change time indicator 500 informs a time to change the water purifying filter 400 so that the water purifying filter 400 can be changed in a timely manner.

When water is filtered through a plurality of water purifying filters 400 respectively assembled to a plurality of water purifying filter assembly modules 100, one of the plurality of water purifying filter assembly modules 100 may include the filter change time indicator 500. For example, the filter change time indicator 500 may be provided in a water purifying filter assembly module 100 in which the outlet portion 230 is connected by a connection pipe C to a water purifying tank (not shown) storing filtered water. Furthermore, two or more of the plurality of water purifying filter assembly modules 100 may include filter change time indicators 500, or the plurality of water purifying filter assembly modules 100 may each include a filter change time indicator 500. As a result, the time to change all or a portion of the water purifying filters 400 or each of the water purifying filters 400 can be indicated.

The filter change time indicator 500 may be provided to the module body 300. As described above, the module body 300 may be divided into an upper portion and a lower portion. In this case, as shown in the exemplary embodiment with reference to FIG. 3, the filter change time indicator 500 may be provided on the upper portion of the module body 300.

Water, discharged from the filter assembly head 200, may flow into or out of the filter change time indicator 500. To this end, the filter change time indicator 500 may include an entrance 500a, an exit 500b, and a flow channel 500c as shown in the exemplary embodiment with reference to FIGS. 3 and 4. As shown, the entrance 500a of the filter change time indicator 500 may be connected to the outlet portion 230 by a connection pipe C or the like. Although not shown, the exit 500b of the filter change time indicator 500 may be connected by a connection tube C or the like to a water purifying tank (not shown) storing water purified by the water purifying filter 400 or may be connected to the inlet portion 220 of another water purifying filter assembly module 100.

The filter change time indicator 500 may be configured to measure the cumulative flow rate of introduced water and indicate the time to change the water purifying filter 400. To this end, the filter change time indicator 500 may include a rotation member 510 as shown in an exemplary embodiment with reference to FIG. 4. The rotation member 510 may be provided in the flow channel 500c as shown in the drawing regarding this exemplary embodiment. The rotation member 510 may be rotated by the flow of water being introduced into the filter change time indicator 500, and the cumulative flow rate of the introduced water may be measured on the basis of the number of rotations of the rotation member 510.

Figure 4:
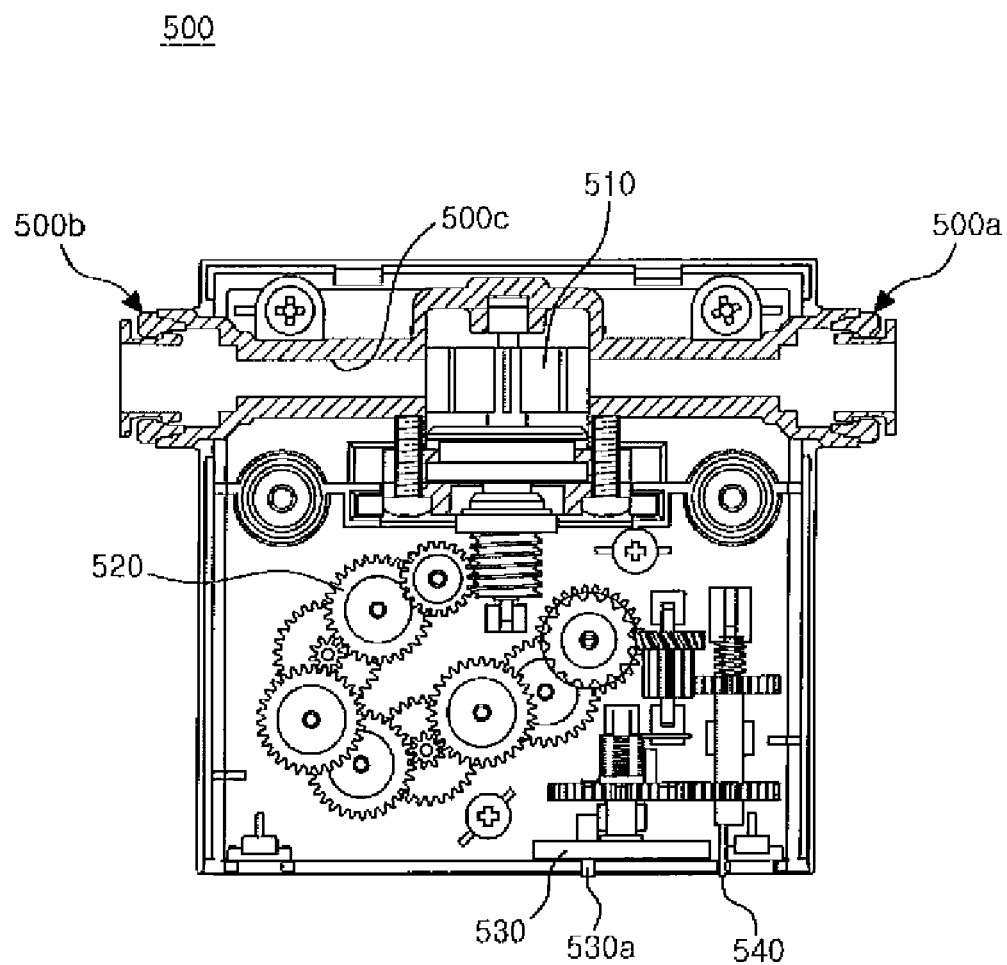
FIG. 4 is a view illustrating the internal configuration of a filter change time indicator included in a water purifying filter assembly module according to another exemplary embodiment of the present invention.

In order to measure the cumulative flow rate of introduced water on the basis of the number of rotations of the rotation member 510, the filter change time indicator 500 may further include a plurality of gears 520 and a display member 530 as shown in the exemplary embodiment with reference to FIG. 4.

As shown in the exemplary embodiment with reference to FIG. 4, the plurality of gears 520 may be connected to the rotation member 510, and may thus be rotated by the rotation of the rotation member 510. Furthermore, the display member 530 may be connected to one of the plurality of gears 520. Thus, the display member 530 may also be rotated by the rotation of the plurality of gears 520. By controlling the gear ratio of the plurality of gears 520, the rotation of the display member 530 may be slowed down in relation to the rotation of the rotation members 510 rotating relatively fast. The rotation of the display member 530 may indicate the time to change the water purifying filter 400. For example, when the rotation member 510 is rotated by the flow of introduced water to an extent as great as a flow rate at which the water purifying filter 400 needs to be changed, the display member 530 may make one rotation according to the gear ratio of the plurality of gears 520. That is, the one rotation of the display member 530 may indicate the time to change the water purifying filter 400. As shown in the exemplary embodiment, the display member 530 may include a display protrusion 530a in order to indicate the location of the rotated display member 530.

A reset member 540 may be provided in the filter change time indicator 500 as shown in the exemplary embodiment with reference to FIG. 4. After the filter change time indicator 500 indicates the time to change the water purifying filter 400 and the water purifying filter 400 is changed accordingly, the reset member 540 may be manipulated such that the display member 530 is moved back to the initial location.

The above configuration that indicates the time to change the water purifying filter 400 by using the plurality of gears 520 and the display member 530, may achieve a reduction in the size of the filter change time indicator 500, prevent breakdowns caused by a water leak, and save on the manufacturing costs for the filter change time indicator 500. However, the configuration for measuring the cumulative flow rate of water by using the rotation of the rotation member 510 is not limited to the embodiment described herein, and any configuration may be used, provided that the cumulative flow rate of water is measured using the rotation of the rotation member 510. For example, the number of rotations of the rotation member 510 may be measured electromagnetically and the cumulative flow rate of water may be then measured by calculating a flow rate for each rotation thereof.

Hereinafter, the operation of the water purifying assembly module 100, according to an exemplary embodiment of the present invention, will now be described with reference to FIGS. 5 through 7.

Figure 5A:
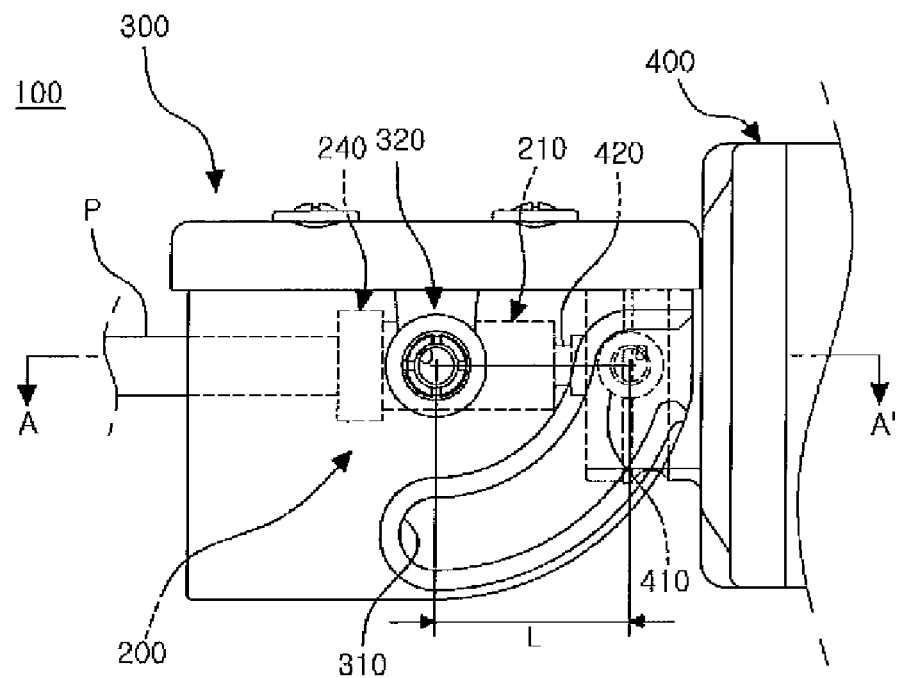
FIG. 5A is a side view illustrating a water purifying filter aligned with a filter assembly head of a water purifying assembly module as a guide protrusion of the water purifying filter is inserted into a movement guide portion of a module body according to an exemplary embodiment of the present invention.
Figure 5B:
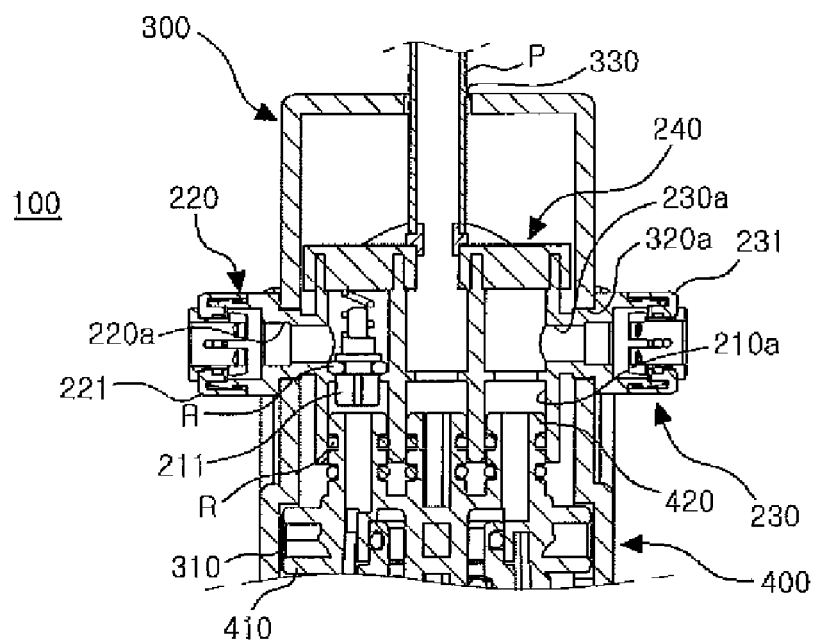
FIG. 5B is a cross-sectional view taken along line A-A' of FIG. 5A.

First, as shown in FIG. 5A, the guide protrusion 410 of the water purifying filter 400 is inserted into the movement guide portion 310 of the module body 300. Thereafter, as shown in FIGS. 5A and 5B, the connection nipples 420 of the water purifying filter 400 are partially inserted into the assembly holes 210a of the filter assembly portion 210 of the filter assembly head 200. In this way, the water purifying filter 400 may be aligned with the filter assembly head 200. Here, the assembly hole 210a is closed by the check valve 211 provided in one of the assembly holes 210a into which the connection nipple 420, introducing water to be purified into the water purifying filter 400, is inserted. In such a way, water does not flow into the water purifying filter 400.

Figure 6A:
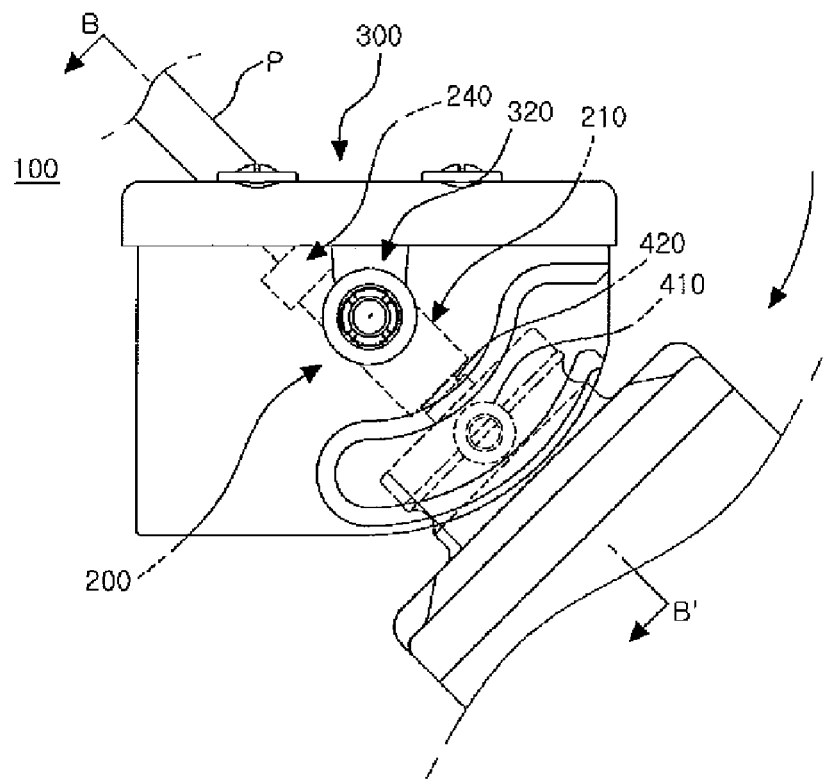
FIG. 6A is a side view illustrating a filter assembly head of a water purifying filter assembly module according to an exemplary embodiment of the present invention that is rotated in a direction of an assembly position of a water purifying filter.
Figure 6B:
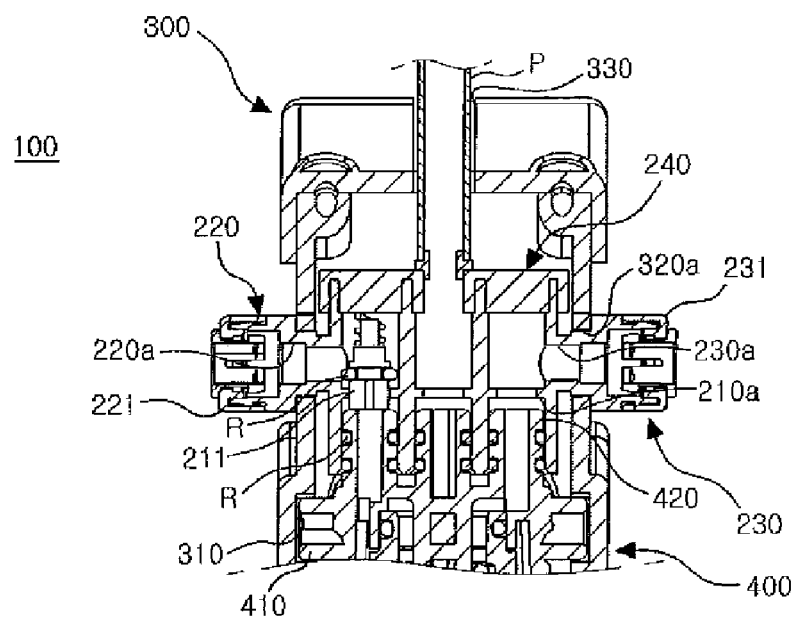
FIG. 6B is a cross-sectional view taken along line B-B' of FIG. 6A.

In this state, as shown in FIG. 6A, the water purifying filter 400 is rotated together with the filter assembly head 200 and located at an assembly position b, so that the guide protrusion 410 of the water purifying filter 400 is moved while being supported by the movement guide portion 310. Accordingly, the water purifying filter 400 can be moved to the assembly position b without being separated to the outside or falling down. When the water purifying filter 400 is rotated to the assembly position b together with the filter assembly head 200, the connection nipples 420 of the water purifying filter 400 may be moved inside the assembly holes 210a of the filter assembly portion 210 of the filter assembly head 210 and be inserted more deeply into the assembly holes 210a as shown in FIG. 6B. When inserted further into the assembly holes 210a of the filter assembly head 200, the connection nipple 420 of the water purifying filter 400 comes into contact with the check valve 211 provided in the assembly hole 210a, thereby pushing the check valve 211. In such a way, the assembly hole 210a is opened so that water can be introduced into the water purifying filter 400.

Figure 7A:
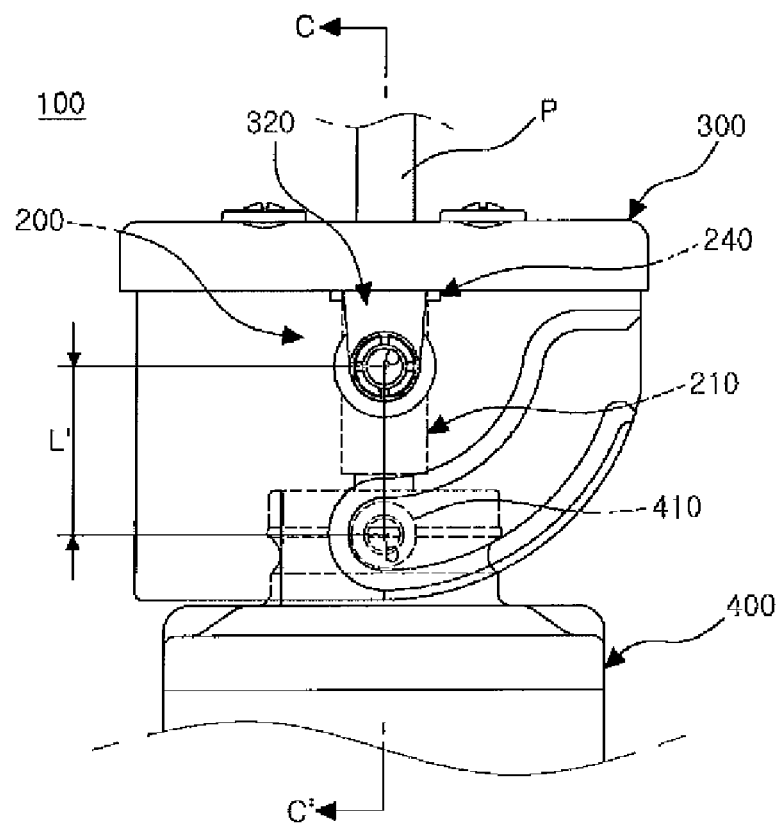
FIG. 7A is a side view illustrating a water purifying filter that is assembled on a filter assembly head of a water purifying filter assembly module according to an exemplary embodiment of the present invention.
Figure 7B:
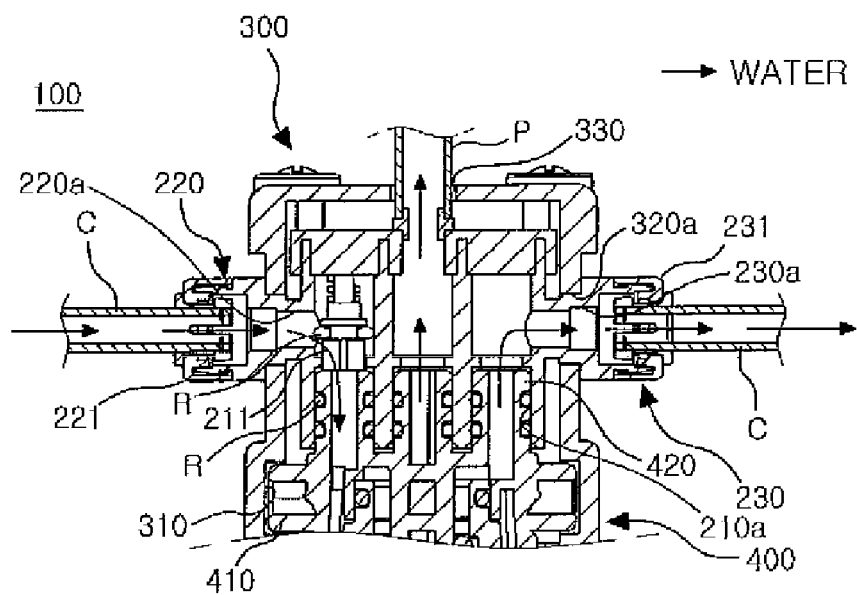
FIG. 7B is a cross-sectional view taken along line C-C' of FIG. 7A.

As shown in FIG. 7A, when the water purifying filter 400 is rotated to the assembly position b together with the filter assembly head 200, the guide protrusion 410 of the water purifying filter 400 is supported by the movement guide portion 310 of the module body 300, so that the water purifying filter 400 is prevented from falling down. Furthermore, the connection nipples 420 of the water purifying filter 400 are fully inserted into the assembly holes 210a of the filter assembly head 200. Also, the check valve 211 is pushed further by the connection nipple 420 and is thus moved to a position allowing the assembly hole 210a to be completely opened as shown in FIG. 7B. Accordingly, as shown in FIG. 7B, water to be filtered is introduced into the assembly hole 210a through the connection member 221 and the flow path 220a of the inlet portion 220. The water to be filtered, which is introduced into the assembly holes 210a, flows into the water purifying filter 400 through the connection nipple 420 of the water purifying filter 400 so as to be filtered. The water, filtered in the water purifying filter 400, is discharged through the connection nipple 420 of the water purifying filter 400 and is then discharged through the assemble hole 210a of the filter assembly portion 210, the flow path 230a and the connection member 231 of the outlet portion 230 as shown in FIG. 7B. When the membrane filter is used as the water purifying filter 400 as in the illustrated exemplary embodiment, unfiltered drain water is discharged through the connection nipple 420 of the water purifying filter 400, the assembly hole 210a of the filter assembly portion 210, and the outlet pipe P for discharging drain water.

When the water purifying filter 400 is released from the filter assembly head 200 so as to be changed, the operation is performed in the opposite order to that of the description, that is, the water purifying filter 400 is moved from the assembly position b at the filter assembly head 200 to the release position a, and the filter assembly head 200 is rotated together with the water purifying filter 400. In such a way, the water purifying filter 400 is released from the filter assembly head 200.

By using the water purifying filter assembly module 100 according to the exemplary embodiments of the invention, the water purifying filter 400 can be assembled while viewing the filter assembly head, and the water purifying filter 400 can be assembled with the water purifying filter assembly module 100 with relatively small force. Furthermore, even if water is introduced into the water purifying filter 400 at high pressure, the water purifying filter 400, being assembled, does not fall down, and water leakage does not occur in the water purifying filter 400 or the water purifying filter assembly module 100 during or after the assembly of the water purifying filter 400. In addition, the water purifying filter 400 can be changed at the proper time by indicating the time to change the water purifying filter 400.

The water purifying filter assembly module is not limited to the configurations described in the above exemplary embodiments, and various modifications can be made by selectively combining all or portion of the exemplary embodiments.

As set forth above, according to exemplary embodiments of the invention, it is possible to assemble a water purifying filter on a filter assembly head provided in a water purifying filter assembly module during the assembly of the water purifying filter while the filter assembly head is being watched.

According to an exemplary embodiment of the invention, a water purifying filter can be assembled on a water purifying filter assembly module with a small force.

According to an exemplary embodiment of the invention, even when high-pressure water flows into a water purifying filter, the water purifying filter can be prevented from falling down during the assembly of the water purifying filter.

According to an exemplary embodiment of the invention, during the assembly of a water purifying filter or after the assembly of the water purifying filter, leakage of water through a portion of the water purifying filter assembly module on which the water purifying filter is assembled can be prevented.

According to an exemplary embodiment of the invention, it is possible to change a water purifying filter in a timely manner since a time to change a water purifying filter can be informed.

What is claimed is:

1. A water purifying filter assembly module comprising:
   a filter assembly head having a water purifying filter assembled on one side thereof, the filter assembly head configured such that water to be filtered flows into the water purifying filter and the water, filtered through the water purifying filter, is discharged to an outside thereof; and
   a module body having the filter assembly head rotatably provided therein, the water purifying filter being released from or assembled on the filter assembly head as the water purifying filter is aligned and rotates with the filter assembly head,
   wherein the module body includes a single pair of movement guide portions into which a guide protrusion, provided on the water purifying filter, is inserted and moved, and the guide protrusion is moved while being supported by the movement guide portions as the filter assembly head rotates together with the water purifying filter while the guide protrusion is inserted into the movement guide portions and the water purifying filter is aligned with the filter assembly head, so that the water purifying filter is released or assembled.

2. The water purifying filter assembly module of claim 1, wherein each movement guide portion forms a curve connecting a release position of the guide protrusion inside the module body at which the water purifying filter is released and an assembly position of the guide protrusion inside the module body at which the water purifying filter is assembled.

3. The water purifying filter assembly module of claim 2, wherein a distance between a rotation center of the filter assembly head and the release position of each movement guide portion is larger than a distance between the rotation center and the assembly position of each movement guide portion.

4. The water purifying filter assembly module of claim 1, wherein the filter assembly head comprises:
   a filter assembly portion on which the water purifying filter is assembled, the filter assembly portion configured such that water to be filtered flows into the water purifying filter and the water, filtered through the water purifying filter, is discharged;
   an inlet portion connected to the filter assembly portion such that water flows into the filter assembly portion, the inlet portion rotatably provided on a rotation portion provided on one side of the module body; and
   an outlet portion connected to the filter assembly portion such that water is discharged from the filter assembly portion, the outlet portion rotatably provided on a rotation portion provided on the other side of the module body.

5. The water purifying filter assembly module of claim 4, wherein the filter assembly portion comprises a check valve being closed when the water purifying filter is released in order to prevent water from flowing into the water purifying filter and being opened when the water purifying filter is assembled in order to introduce water into the water purifying filter.

6. The water purifying filter assembly module of claim 1, further comprising a filter change time indicator provided in the module body and indicating a time to change the water purifying filter.

7. The water purifying filter assembly module of claim 6, wherein the filter change time indicator is configured to receive or discharge water, discharged from the filter assembly head, measure a cumulative flow rate of introduced water, and indicate the time to change the water purifying filter.

8. The water purifying filter assembly module of claim 7, wherein the filter change time indicator comprises a rotation member rotated by the flow of water being introduced thereinto,
wherein the filter change time indicator measures a cumulative flow rate of introduced water on the basis of the number of rotations of the rotation member.

9. The water purifying filter assembly module of claim 8, wherein the filter change time indicator further comprises:
a plurality of gears connected to the rotation member; and
a display member connected to one of the plurality of gears,
wherein the filter change time indicator indicates the time to change the water purifying filter by the rotation of the display member caused by the rotation of the rotation member and the plurality of gears.

* * * * *